US006836514B2

(12) United States Patent
Gandhi et al.

(10) Patent No.: US 6,836,514 B2
(45) Date of Patent: Dec. 28, 2004

(54) METHOD FOR THE DETECTION AND RECOVERY OF ERRORS IN THE FRAME OVERHEAD OF DIGITAL VIDEO DECODING SYSTEMS

(75) Inventors: Bhavan Gandhi, Vernon Hills, IL (US); Kevin O'Connell, Palatine, IL (US); Faisal Ishtiaq, Chicago, IL (US); Raghavan Subramaniyan, Arlington Heights, IL (US)

(73) Assignee: Motorola, Inc., Schaumburg, IL (US)

( * ) Notice: Subject to any disclaimer, the term of this patent is extended or adjusted under 35 U.S.C. 154(b) by 710 days.

(21) Appl. No.: 09/901,809

(22) Filed: Jul. 10, 2001

(65) Prior Publication Data

US 2003/0053546 A1 Mar. 20, 2003

(51) Int. Cl.[7] .................................................. H04N 7/18
(52) U.S. Cl. .............................. 375/240.27; 375/240.28
(58) Field of Search ...................... 375/240.25–240.29; 348/461–467

(56) References Cited

U.S. PATENT DOCUMENTS

| | | | | |
|---|---|---|---|---|
| 5,376,969 A | * | 12/1994 | Zdepski | 348/466 |
| 5,440,345 A | * | 8/1995 | Shimoda | 375/240.14 |
| 5,517,495 A | * | 5/1996 | Lund et al. | 370/399 |
| 5,568,200 A | * | 10/1996 | Pearlstein et al. | 375/240.27 |
| 5,640,388 A | * | 6/1997 | Woodhead et al. | 370/468 |
| 5,719,646 A | * | 2/1998 | Kikuchi et al. | 375/240.27 |
| 5,812,735 A | * | 9/1998 | Wada | 386/81 |
| 6,175,573 B1 | * | 1/2001 | Togo et al. | 370/474 |
| 6,404,817 B1 | * | 6/2002 | Saha et al. | 375/240.27 |
| 6,415,398 B1 | * | 7/2002 | Kikuchi et al. | 714/701 |
| 6,490,405 B1 | * | 12/2002 | Speed et al. | 386/65 |
| 6,661,811 B1 | * | 12/2003 | Baker | 370/516 |

* cited by examiner

*Primary Examiner*—Andy Rao
(74) *Attorney, Agent, or Firm*—Kenneth A. Haas

(57) ABSTRACT

The disclosed invention is a method to detect candidate errors within the picture start code, picture header, and picture timestamp. Upon detection, these errors may be confirmed and the impacts mitigated. An error within the timestamp bit field is adaptively detected by the use of a threshold comparison, and a mechanism for concealing the timestamp information leaves only a small timestamp anomaly. An error within the picture start code (PSC) is determined by adaptively analyzing the number of bits and the macro-block location of the next slice or GOB. If a PSC is suspected to have been overrun due to an error, this method allows for data beyond the first GOB or slice to be recovered in the frame. Depending on the extent of use of slices and GOBs, the method can recover a majority of the frame that otherwise would have been completely lost. A candidate error within the picture header is evaluated by utilizing the first slice or GOB of the frame and analyzing information from a previous frame to check whether the current frame's header information should be replaced with the previous frame's header information. Replacing the erred frame header can result in a majority of the data within the frame being recovered that would otherwise be discarded if the header was not replaced.

107 Claims, 8 Drawing Sheets

METHOD FOR THE DETECTION AND RECOVERY OF ERRORS IN THE FRAME OVERHEAD OF DIGITAL VIDEO DECODING SYSTEMS

TECHNICAL FIELD

This invention relates to the field of digital image and video coding, and more specifically to the area of error detection and data recovery while decoding an erroneous bitstream.

BACKGROUND OF THE INVENTION

Transmission and storage of uncompressed digital video requires a large amount of bandwidth. Video compression is necessary to reduce the bandwidth to a level suitable for transmission over channels such as the Internet and wireless links. H.263, H.261, MPEG-1, MPEG-2, and MPEG-4 international video coding standards provide a syntax for compressing the original source video allowing it to be transmitted or stored using a fewer number of bits. These video coding methods serve to reduce redundancies within a video sequence at the risk of introducing loss in quality. However, the resulting compressed bitstream is much more sensitive to bit errors. When transmitting the compressed video bitstream in an error prone environment, the decoder must be resilient in its ability to handle and mitigate the effects of these bit errors. This requires the need for a robust decoder capable of resolving errors and handling them adeptly.

FIG. 1 is a simplified block diagram of an exemplary block-based video coder 100. The input 102 is typically a sequence of values representing the luminescence (Y) and color difference (Cr and Cb) components of each pixel in each image. The sequence of pixels may be ordered according to raster (line by line) scan of the image. At block 104 the sequence of pixels is reordered so that the image is represented as a number of macroblocks of pixels. In a 4:2:0 coding system, for example, each macroblock is 16 pixels by 16 pixels. In video, the images often change very little from one images to the next, so many coding schemes use inter-coding, in which a motion compensated version 127 of the previous image is subtracted from the current image at 106, and only the difference image 107 is coded. The luminescence (Y) macroblock is divided into four 8×8 sub-blocks, and a Discrete Cosine Transform (DCT) is applied to each subblock at 108. The color difference signals (Cb and Cr) are sub-sampled both vertically and horizontally and the DCT of the resulting blocks of 8×8 pixels is applied at 108. The DCT coefficients are quantized at quantizer 110 to reduce the number of bits in the coded image. Variable length coder 112 is then applied to convert the sequence of coefficients to serial bit-stream and further reduce the number of bit in the coded image 114.

In order to regenerate the image as seen by a decoder, an inverse variable-length coder 116, an inverse quantizer 118 and an inverse DCT 120 are applied. This gives the reconstructed difference image 121. The motion compensated version 127 of the previous image is then added at 122 to produce the reconstructed image. The reconstructed image is stored in frame store 128. The previous reconstructed image 129 and the current image 102 are used by motion estimator 124 to determine how the current image should by aligned with the previous reconstructed images to minimize the difference between them. Parameters describing this alignment are passed to variablelength coder 130 and the resulting information 132 is packaged with the DCT coefficients 114 and other information to form the final coded image. Motion compensator 126 is used to align the current image and produces motion compensated image 127.

In this inter-coding approach, each image depends upon the previous image, so an error in a single macroblock will affect macroblocks in subsequent frames. In order to mitigate this problem, macroblocks may be intra-coded periodically, i.e. coded without reference to any other macroblock.

FIG. 11 shows the decoding process 1100 of an exemplary decoder. Decoding of a frame begins by first decoding the picture header using a picture header decoder as in block 1110. This is followed by decoding of the GOB or slice header information (block 1115). The macroblock data 132' and 114' is then decoded in the macroblock data decoder shown in block 1120 and described in FIG. 2. If a new slice is signaled after the decoding of a macroblock has finished (decision block 1125), the operation of the decoder returns to the GOB or slice header decoder (block 1115). If a new frame is found after the macroblock (decision block 1130), the decoder returns to the picture header decoder (block 1110), and begins to decode the next frame. If a new slice or frame is not signaled after the current macroblock, another macroblock is assumed (block 1130) and is decoded in block 1120, as described in FIG. 2.

An exemplary decoder 200, suitable for use with the encoder 100 of FIG. 1, is shown in FIG. 2. The input bit-stream 524' (the apostrophe is used to indicate the signal may contain bit errors) may be modified from the bitstream produced by the coder by transmission or storage errors that alter the signal. Demultiplexer 201 separates the coefficient data 114' and the motion vector data 132' from other information. The input 114' may be modified from the output 114 from the coder by transmission or storage errors that alter the signal. The image is reconstructed by passing the data through an inverse variable-length coder 202, an inverse quantizer 204 and an inverse DCT 206. This gives the reconstructed difference image 208. The inverse variablelength coder 202 is coupled with a syntax error detector 228 for identifying errors in the data. The coded motion vector 132' may be modified from the output 132 from the coder by transmission or storage errors that alter the signal. The coded motion vector is decoded in inverse variable-length coder 222 to give the motion vector 224. Coupled with the inverse variable-length coder 222 is a syntax error detector 230 to detect errors in the coded motion vector data 132'. The previous motion compensated image 212 is generated by motion compensator 226 using the previous reconstructed image 220 and the motion vector 224. The motion compensated version 212 of the previous image is then added at 210 to produce the reconstructed image. Error correction may be applied at 215 if errors are identified by either the syntax error detectors, 228, or 230 or by other information contained in the bitstream. The correction may use techniques that utilize the motion vector information 224 in conjunction with the previously reconstructed frame 220. The reconstructed image 214 is stored in frame store 218. The sequence of pixels representing the reconstructed image 214 may then be converted at 216 to raster scan order to produce a signal 217 that may be presented to a visual display unit for viewing.

In their basic mode of operation H.261, H.263, MPEG-1, MPEG-2, and MPEG-4 code each frame in a hierarchical manner as shown in FIG. 3. The information transmitted for each frame includes the picture start code (PSC), picture header, group of block (GOB) or slice headers, macroblock information, and texture information for each coded block. The general structure of this transmitted bitstream is shown in FIG. 4. The PSC, picture header, and slice headers may be considered overhead information that enable the decoder to recover and decode the received bitstream with a high probability of error. It should also be noted that while the structure shown in FIG. 3 and FIG. 4 imply that header information follows each slice, it is also possible for the header information be split so that some or all of the header information occurs once every several slices.

One of the most important fields in the bitstream is the picture start code. The PSC is a special sequence of bits that is transmitted before each frame and serves two key purposes. First, the PSC delineates the start of a new frame, and second, it serves as resynchronization markers within the bitstream in the event of bit errors. Bit errors corrupting the picture start code can lead to the loss of the entire frame. This is because the decoder may not realize that a new frame has begun and will overrun the PSC by continuing to decode the picture header and subsequent data as if it belonged in the current frame. This can result in the loss of the entire frame and lead to substantial degradations in the video that will propagate due to the predictive nature of video coding.

It is therefore important for a decoder to be able to recognize that a picture start code has been corrupted. By being able to suspect a PSC overrun, the decoder may be able to recover valid data within the frame, reducing the amount of information lost to a GOB or a slice as opposed to losing the entire frame.

A method for detecting whether or not the PSC of a frame may have been overrun is to check the macroblock address of the next slice. If the macroblock address of the next slice or GOB is equal to or less than the address of the current slice or GOB, it can be assumed that the slice resides in the next frame and the PSC has been overrun. However, a shortcoming of this approach is evident when the macroblock address of the next slice itself may be in error. Bit errors in the macroblock address field can account for the address being corrupted and lead to the decoder decoding the next slice under the assumption that it lies in the next frame.

The picture header, which often follows the picture start code, contains vital information about the frame such as the timestamp, type, size, coding modes, quantization value, and miscellaneous administrative information required to correctly decode a frame. A bit error in any of the fields of the picture header can degrade the quality of the frame greatly. Errors in the timestamp information can cause the decoder to display images either in an incorrect order or not at all, possibly causing loss in synchronization with the associated audio. More severe errors may arise if coding modes or options are erroneously changed. These modes and options require the decoder to use special techniques, coding tables, or other configurations that will likely cause errors throughout the entire frame if not decoded correctly. These types of errors typically manifest themselves very early in the frame and lead to the entire frame being decoded in error even if data beyond the header is received error free.

The importance of the picture header is stressed in H.263 by providing a facility for determining changes in the picture header from frame to frame. This is accomplished by the use of the GOB frame ID (GFID) field within GOB and slice headers. The GFID is a 2 bit field whose value is that of the GFID of the previous frame if certain and important fields in the picture header have not changed. The GFID value remains constant in each GOB or slice header within a frame. A GFID that is different from the previous frame's GFID value indicates that information in the header has changed. While indicating that header information has changed, a different GFID value does not specify which fields in the picture header were changed.

Video compression standards such as H.261, H.263, MPEG-1, MPEG-2, and MPEG-4 achieve efficient compression by reducing both temporal redundancies between video frames and spatial redundancies within a video frame. Each frame has associated timestamp information that identifies its temporal location with respect to some unit of time. As such, timestamps for sequential frames are represented as sequential integers.

As indicated in FIG. 1, a typical video encoder may be rate controlled to achieve a prescribed bit rate. This may result in selectively dropping frames to meet communication channel bandwidth capabilities. However, the timestamp for each coded frame must be transmitted in the coded bit stream. A decoder uses this timestamp to correctly display decoded frames at the same rate as the original source frame rate. Since it is inefficient to transmit the absolute timestamp for each encoded frame, the timestamp information is often processed using a mathematical modulo operation and the residual information is encoded. Equation (1) shows the mathematical relationship between the encoded timestamp, TR, and the absolute timestamp, currTR, with respect to the Modulo base, Base, for a frame.

$$TR = currTR \bmod(Base). \tag{1}$$

For example, in the case of H.263, Base=256. Therefore, each frame n has an encoded timestamp value range of [0, 255] stored in an 8-bit field. This mechanism for encoding the timestamp is known by the decoder, thereby allowing it to reconstruct the absolute frame timestamp value.

The general relationship used by a decoder to reconstruct the absolute timestamp value for frame n that has been encoded with the above described Modulo operation is given in equation (2). In equation (2), the division operation corresponds to integer division with truncation.

$$currTR = TR, \quad \text{for frame} = 0; \tag{2}$$

$$currTR = \frac{lastTR}{Base} * Base + TR, \quad \text{for frame} \neq 0;$$

if (frame ≠ 0 and (currTR ≤ lastTR)) currTR = currTR + Base.

The absolute timestamp for current frame, currTR, is reconstructed by a decoder with knowledge of the Base value used by an encoder.

Timestamp information in MPEG-4 is encoded and reconstructed in a slightly different manner. The timestamps are coded as a fractional part of a second with the number of seconds elapsed since the last frame being signaled explicitly (modulo_time_base). The general relationship used by a decoder to decode an MPEG-4 encoded timestamp is given below.

$$currTR = \frac{TR}{Base} + seconds$$

In error free environments, the method described above is straightforward and is used to reconstruct currTR for each frame at the decoder. The decoder in turn uses this timestamp information to appropriately display the frame.

In error prone environments, bit errors may corrupt the encoded timestamp field, TR, of the encoded frame. This will result in incorrectly reconstructing currTR. Using the reconstruction mechanism described by equation (2), a delay of up to (Base-1) time units could be added. Although this may have no effect in reconstructing the actual image data within a frame, it will mark the frame with an incorrect timestamp. For video streaming applications, this will result in the decoder introducing a delay in displaying the entire video sequence. This delay may be substantial, e.g., when the time unit is 1/30 second and the Base is 256, the delay introduced could be up to 8.5 seconds. In the event that there is associated audio, this will result in having the video sequence and the audio stream mismatched. In addition to the annoying delay of video and the resulting mis-match with audio, the incoming bitstream will need to be buffered and may overflow the available buffer, resulting in lost data and degrading the video.

There is an unmet need in the art for a technique for detecting errors in the picture header and start code information and correcting or mitigating them. Specifically, there is a need for an adaptive timestamp reconstruction and concealment mechanism that is resilient to channel errors affecting the timestamp field of an encoded frame. There is a further need in the art for a method of suspecting PSC overrun that overcomes the weakness of using only the macroblock address, thereby permitting the decoder to suspect PSC overruns more confidently, allowing it to recover data in the frame, reducing the overall distortion, increasing the number of decoded frames, and recovering a majority of the frame that otherwise would have been completely lost.

There is also a need in the art for a technique for suspecting errors in the picture header and mitigating them. Detecting the erred frame header can result in a majority of the data within the frame being recovered that would otherwise be discarded if the header error was not detected. Header error detection techniques can also be used to ensure the validity of the current header information.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
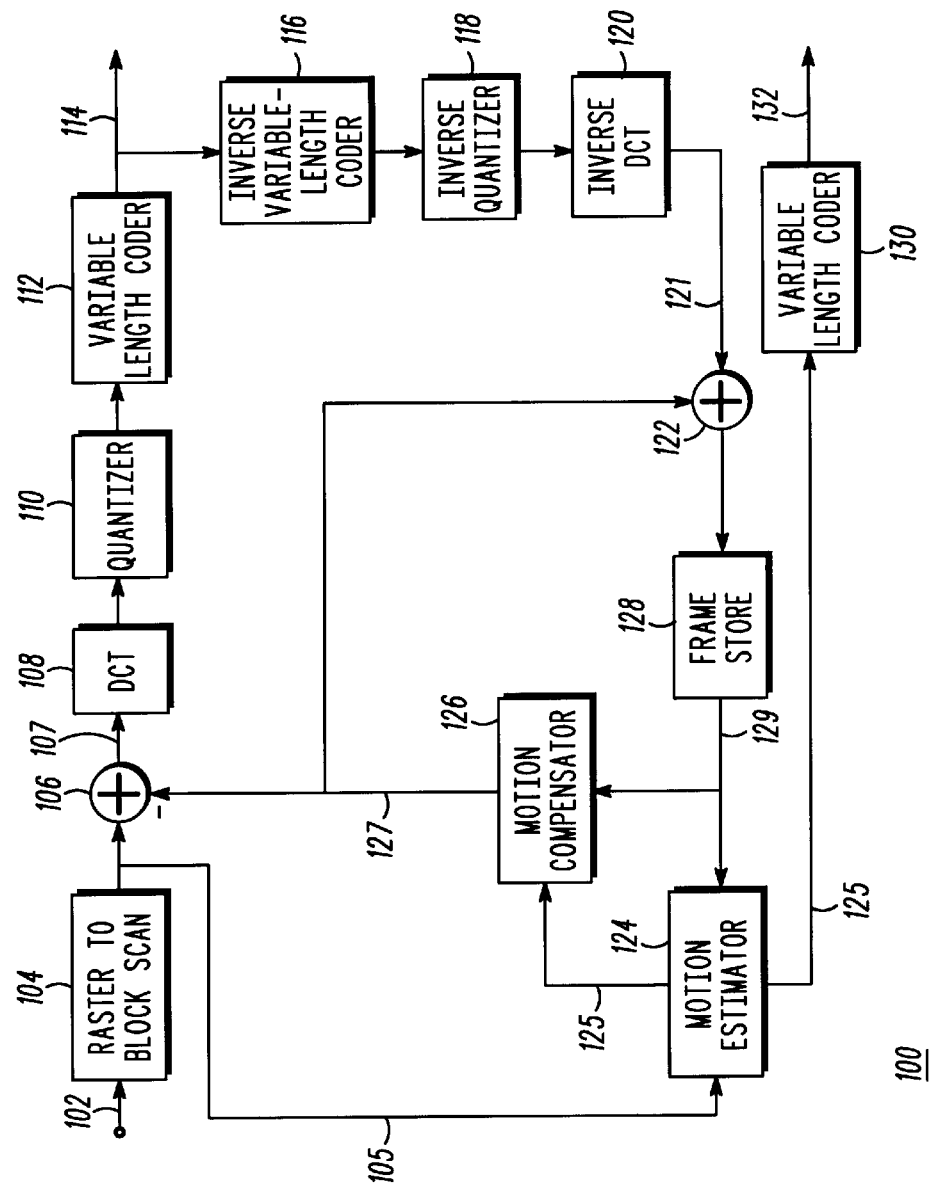
FIG. 1 is a simplified block diagram of an exemplary video coder.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 6:
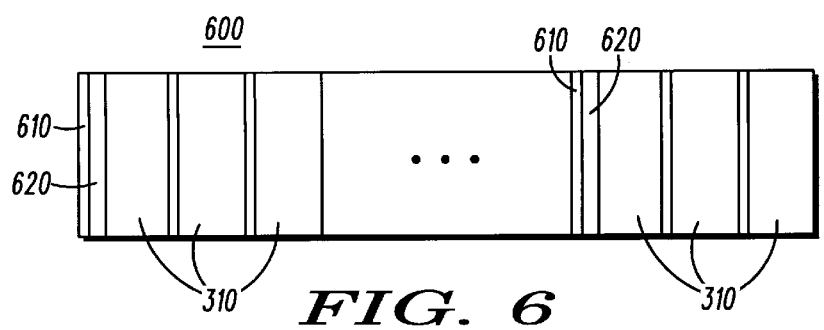
FIG. 6 is an exemplary bitstream used in video coding applications.
Figure 7:
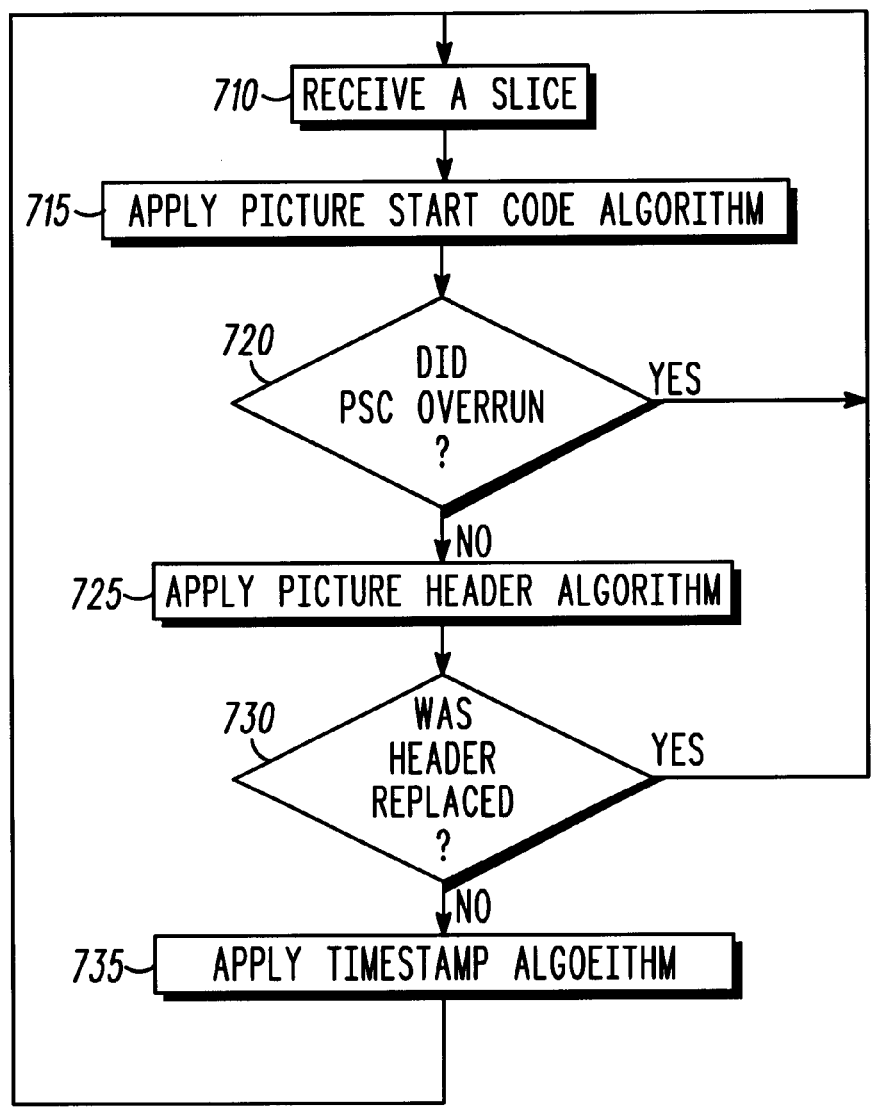
FIG. 7 is a flowchart of an error detection and recovery module for a digital video decoder, according to the present invention.

Referring now to FIG. 7, a flowchart of an error detection and recovery module 700 for a digital video decoder is illustrated. The error detection and recovery module 700 operates on the bitstream 600 illustrated in FIG. 6 in order to make a determination as to whether any portion of the overhead of the digital video has been received in error. This overhead includes, but need not be limited to the picture start code, picture header, and the timestamp information. In the preferred embodiment, the timestamp information is contained in the picture header. However, the timestamp could be placed in a separate field within the bitstream without departing from the spirit and scope of the present invention.

Referring again to FIG. 7, in block 710 a decoder receives a slice or GOB of bitstream 600. At block 715 picture start code algorithm is applied to the slice to determine if a picture start code (PSC) has been overrun. The picture start code algorithm computes a statistical measure reflecting the expected number of bits contained in a slice, and uses this information combined with the macroblock location of the next slice to determine whether the PSC as been overrun. The picture start code algorithm of block 715 is described in more detail in FIG. 9. If the PSC is received without error, as determined at decision block 720, the error detection and recovery module 700 then applies a picture header algorithm at block 725 to determine if the header information is correct. The picture header algorithm at block 725 checks for one or more errors in the header of the current slice; more details about the picture header algorithm are described in conjunction with FIG. 10. If header errors are detected, the current header is replaced with the header of a previous slice. If the header was received correctly, as determined at decision block 730, then a timestamp algorithm is applied at block 735 to reconstruct the absolute timestamp information. The timestamp algorithm of block 735, described further in conjunction with FIG. 8, determines whether the received timestamp is correct by using prior timestamp information in addition to a threshold based upon the current timestamp and previous timestamp. Upon the completion of the timestamp algorithm at block 735, the flow returns to block 710 so that the process of error detection and recovery 700 is repeated for each slice or GOB of bitstream 600.

It is noted here that while in the preferred embodiment the ordering of the picture start code, picture header, and timestamp algorithms are as shown in FIG. 7, the algorithms could be executed in a different order than that illustrated in FIG. 7. It should further be noted that one or two of the picture start code algorithm at Block 715, picture header algorithm at Block 725, and timestamp algorithm at Block 735 need not be present in order for the remaining aspects of the present invention to work correctly. For example, it may be desirable in certain applications to perform timestamp checking and reconstruction but not perform the picture header algorithm 725 or the picture start code algorithm 715. This situation could occur if frame synchronization is required, but the frame information is not utilized. Additionally, further decoder functionality may be placed between the blocks 715, block 725, and block 735 without departing from the spirit and scope of the present invention.

Figure 8:
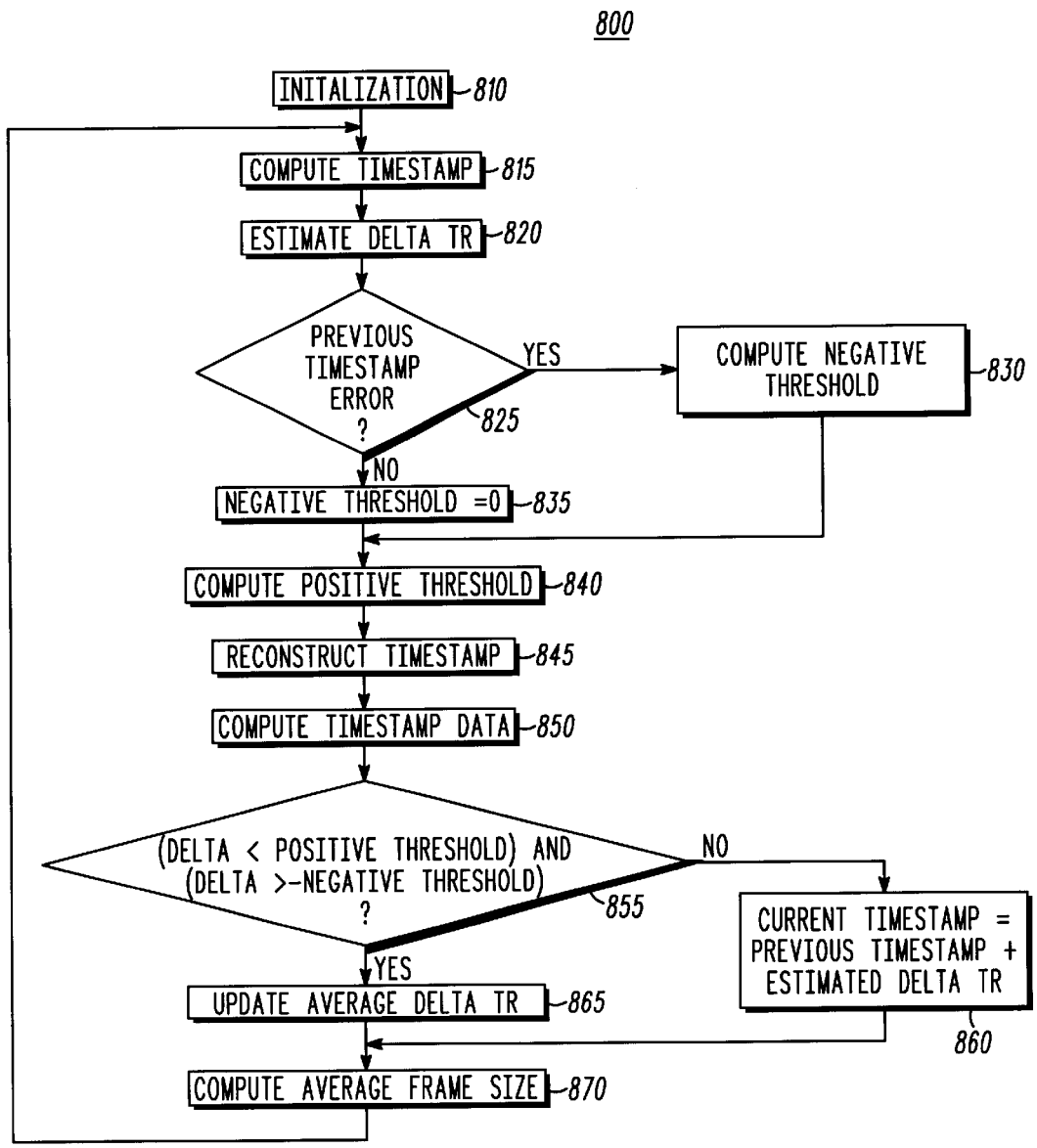
FIG. 8 is a flowchart of a timestamp error detection and recovery module, according to the present invention.

Referring now to FIG. 8, a flow chart describing in further detail the operation of the timestamp algorithm shown in block 735 of the present invention is shown generally as 800. Bit errors introduced in the communication channel may corrupt the encoded timestamp information for a frame, TR. An erroneous TR for a frame ultimately results in incorrect reconstruction of the absolute timestamp information for the frame, currTR. An incorrect currTR value may result in introducing delay in displaying the video frame, possibly causing video and audio to be objectionably unsynchronized.

The pseudocode shown below, which provides more detail in accordance with the flowchart of FIG. 8, represents an adaptive method for detecting erroneous currTR, and concealing the currTR information to minimize any potential delay that is introduced resulting from corrupted TR. It is recognized that the pseudocode illustrates one particular implementation or embodiment of many for practicing the methodology of this aspect of the present invention. Without limiting the scope of the invention, in this example the MPEG-4 timestamps are assumed to be scaled such that a value of 30.0 represents one second. It should also be recognized that $\eta$, $\mu$, $C_1$, $C_2$, $C_3$, and $C_4$ may be interpreted as variable quantities without departing from the spirit and scope of the present invention.

```
/* Initialize variables - Done once before frame 0 */
prevDeltaTR    = INIT_DELTA_TR;    // previous delta timestamp
lastTR         = -1;               // helps deal with frame 0.
averageDeltaTR = INIT_DELTA_TR;    // Estimated deltaTR
estimatedDeltaTR = INIT_DELTA_TR;  // Estimated deltaTR
threshExtension = 0;               // Increase in threshold
previousTimeStampInError = 0;
η = 0.94;
μ = 1 - η;
C₁ = 4;
C₂ = 2;
C₃ = 2;
C₄ = 1;
  . . .
/* Process and compute absolute timestamp information */
if (MPEG_4)
     currTR = TR + 30.0 * moduo_time_base;
else
     currTR = (lastTR / Base) * Base + TR;
/* Estimate elapsed time since last frame */
if (lastTR != -1)   // Not first frame
     estimatedDeltaTR = (averageDeltaTR * prevFrameSize)
                          / averageFrameSize;
/* Compute Thresholds */
if (previousTimeStampInError)
     threshExtension++;
else
     threshExtension = 0;
if (previousTimeStampInError)
     negativeThreshold = (C₃ * estimatedDelta TR) +
                          (C₄ * threshExtension);
else
     negativeThreshold = 0;
positiveThreshold = (C₁ * estimatedDelta TR) +
                     (C₂ * threshExtension);
/* Check for wrap around and add Base if necessary for
     reconstruction (except MPEG-4) */
if ((!MPEG_4) && (currTR < (lastTR - negativeThreshold)))
     currTR += Base;
```

```
/* Detect and conceal timestamp errors */
deltaTR = currTR - lastTR;
if ((deltaTR < positiveThreshold) &&
        (deltaTR > -negativeThreshold))    // No errors
{
    // currTR assumed correct
    error = 0;
}
else                    // conceal currTR
{
    // timestamp error detected - conceal currTR
    currTR = lastTR + estimatedDeltaTR;
    error = 1;
}
previousTimeStampInError = error;
/* Compute thresholds for next frame */
if (!error)
    averageDeltaTR = (η *averageDeltaTR) + (μ*deltaTR;)
  . . .
/* After decoding the entire frame */
prevFrameSize = BitCounterAtEndFrame - BitCounterAtStartFrame;
averageFrameSize = (η * averageFrameSize) +
        (μ* prevFrameSize);
  . . .
```

After initialization (block 810), the first part of the pseudo code computes currTR (block 815).

The next step is to estimate the elapsed time (estimateDeltaTR) between the previously decoded frame and the current frame based on the history of bits per frame and history of inter-frame time intervals (block 820). In the preferred embodiment, one example of deriving the expected elapsed time is calculated as the averageDeltaTR times the previousFrameSize divided by averageFrameSize.

Next, thresholds are computed for detecting timestamp errors and timestamp wrap-around. The wrapping around is done to undo the mathematical Modulo operation that was used by the encoder to compute TR. For some signaling formats, such as MPEG-4, only the fractional part of a second is signaled, and the wrap-around at the next second boundary is explicitly signaled as a separate parameter (modulo_time_base). In this case, currTR is calculated independently of lastTR. Errors could be present in both TR and modulo_time_base. Both of these types of errors need to be handled.

One method for detecting timestamp wrap-around and timestamp errors utilizes a negativeThreshold and a positiveThreshold. The method wraps around currTR only if currTR is less than lastTR by at least negativeThreshold. The timestamp is deemed correct if it lies in the interval (-negativeThreshold, positivethreshold), else it is deemed to be in error. The interval for correctness (-negativeThreshold, positiveThreshold) is increased if timestamp errors were concealed in the previous frames. The parameter threshExtension governs the increase in the threshold interval. The parameter threshExtension is reset to zero if the timestamp of the previous frame is correct. This was done to improve recovery and prevent divergence between the actual and concealed timestamp values.

The value of negativeThreshold is set depending upon previous timestamp errors (block 825). If there was a previous timestamp error, the negativeThreshold is computed (block 830) from the estimated change in timestamp between the current frame and the previous frame and the value of the threshold extension. If there was not a timestamp error in the previous frame, then the negativeThreshold is set to zero (block 835). The value of positiveThreshold is then computed (block 840). As shown in the pseudocode, the positiveThreshold is also computed from the estimated change in timestamp between the current slice and the previous slice and the value of the threshold extension.

The current absolute timestamp, currTR, is then reconstructed (block 845). As shown in the pseudocode, this reconstruction uses the last reconstructed timestamp and adds a constant to the timestamp depending upon the signaling used. Once currTR for the current frame is reconstructed, the result must be compared to the absolute reconstructed timestamp of the previous frame, lastTR, to help detect errors in currTR. As such, a mathematical difference is computed between currTR and lastTR to give the change in timestamp information between the current frame and the previous frame, deltaTR (block 850). If the deltaTR is within the interval (−negativeThreshold, positiveThreshold), the currTR is assumed correct (block 855) and the average delta TR is updated (block 865). If the deltaTR is not within the interval (−negativeThreshold, positiveThreshold), then the currTR is in error. The currTR is then concealed by setting currTR to (lastTR+ estimatedDeltaTR) which is the expected timestamp value based on the statistics of the time increments as well as the number of bits used to encode the previous frame (block 860). This takes advantage of the correlation that exists between the timestamp differences and the size (in number of bits) of a compressed frame and enables the concealed timestamp values to resemble the actual timestamp values more closely. The effect of this concealment method is to display the current frame immediately, thus allowing the possibility for recovering absolute timestamp information in subsequent frames. Without departing from the spirit and scope of the present invention, it is also possible to set the estimatedDeltaTR to one. The average frame size is then computed at the end of frame decoding for use on the next frame (block 870).

Those of ordinary skill in the art will recognize that the timestamp algorithm has been described in terms of exemplary embodiments. One skilled in the art will also recognize that while the form and logical structure of the pseudocode is novel, the pseudocode contains constant values that may be modified without departing from the spirit and scope of the present invention.

Figure 9:
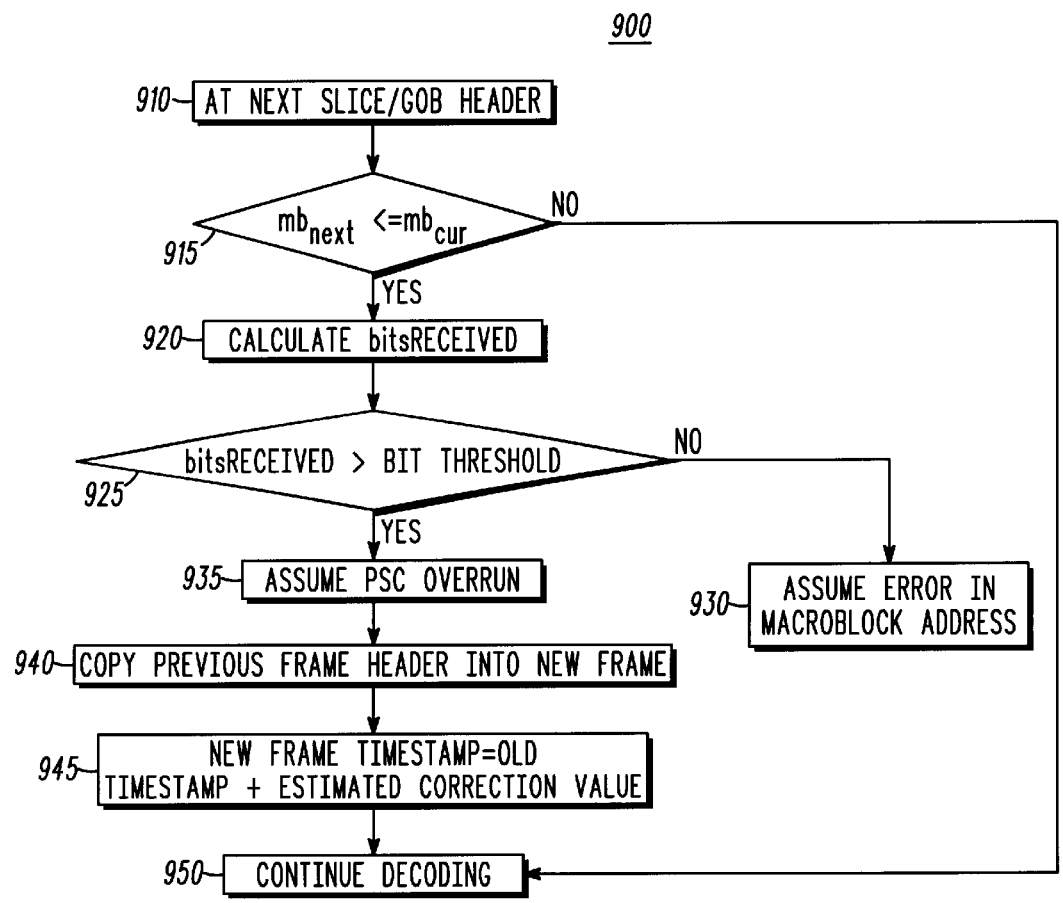
FIG. 9 is a flowchart of a picture start code error detection and recovery module, according to the present invention.

Referring now to FIG. 9, the picture start code (PSC) algorithm 900 of Block 715 is shown in more detail. The preferred embodiment uses the macroblock address contained within a GOB or slice header in conjunction with an adaptive bit threshold to determine a PSC overrun due to bit errors. Define $mb_{curr}$ to be the macroblock address of the current slice in frame k. In conventional decoding, the decoder continues to decode the current slice or GOB until a new resync marker or PSC is encountered. If bit errors cause a PSC to be corrupted, the PSC will not be recognized and overrun. Thus the next slice or GOB header the decoder will decode is the second GOB or slice of the following frame, k+1. Define the address of this slice or GOB to be $mb_{next}$. In the preferred embodiment, the detection technique first receives the next slice or GOB header (block 910). The algorithm then compares the addresses of the two slices (block 915). If $mb_{next}$ is equal to or less than $mb_{curr}$, the technique then checks the number of bits that were received from the beginning of the current slice to the start of the next slice or GOB, defined as bitsReceived (block 920). The PSC is then suspected to have been overrun (block 935) if bitsReceived exceeds the threshold for the average number of bits expected between the two slices (block 925). If the bitsReceived does not exceed the threshold, then an error is assumed in the macroblock address (block 930).

The adaptive threshold, bitThreshold, is a weighted average of the number of bits that are expected to have been received by the decoder between $mb_{curr}$ and $mb_{next}$. Mathematically it is defined as $$bitThreshold \alpha * avgBitsPerMBPrevFrame * numMB$$

where avgBitsPerMBPrevFrame represents the average number of bits per macroblock received in the previous frame, α is a weighting factor, and numMB is the number of macroblocks that lie between $mb_{curr}$ and $mb_{next}$. In an alternative embodiment, the avgBitsPerMBPrevFrame may be calculated using the average number of bits per macroblock received in the current frame, or using more than one prior frame for the calculation. The number of macroblocks, numMB, between $mb_{curr}$ and $mb_{next}$, when $mb_{curr}$ is numerically greater than $mb_{next}$, can be calculated using a modulo operation or as $$numMB = (totalMBPerFrame - mb_{curr}) + mb_{next}$$

where totalMBPerFrame is the total number of macroblocks in the frame.

Thus, the PSC overrun decision can be written as bits Received>bitThreshold: Assume PSC Overrun bits Received≦bitThreshold: Assume Error in the MB Address.

If a PSC overrun is suspected, all data beyond the first slice of the following frame, k+1, can potentially be recovered by decoding the data into a new frame (block 940). In the preferred embodiment, the picture header information for frame k+1 is copied from the header of frame k with the timestamp incremented by the estimated increase in timestamp (block 945). This will lead to a reduction in the overall distortion compared to the case when the PSC is not checked and data for the entire frame is lost. The decoder then continues its decoding process (block 950). The disclosed invention allows the decoder to operate more efficiently, especially in low bit rate scenarios where the frame rate is normally low and the importance of each frame is greater.

Figure 10:
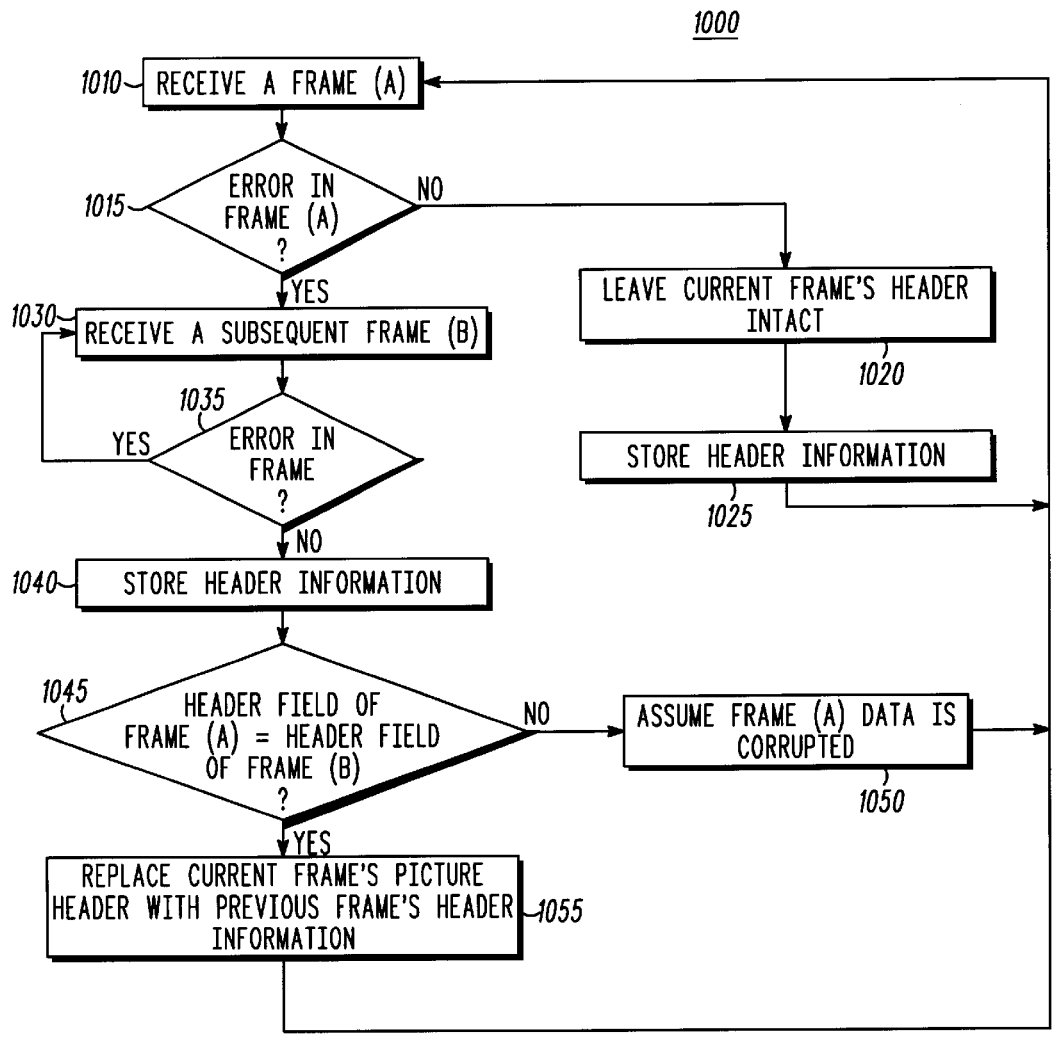
FIG. 10 is a flowchart of a picture header error detection and recovery module, according to the present invention.
Figure 11:
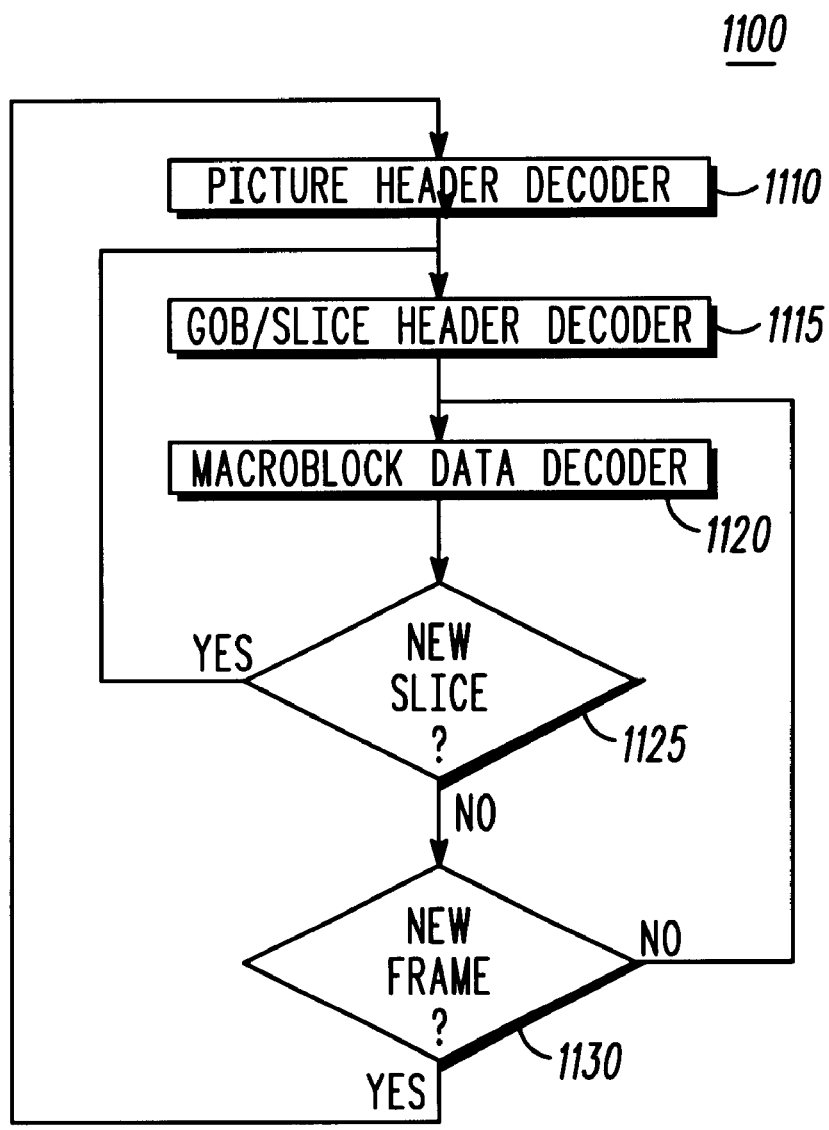
FIG. 11 is a flowchart illustrating the decoding process of an exemplary decoder, according to the present invention.

Referring now to FIG. 10, a flowchart of a picture header error detection and recovery module, introduced at Block 725 of FIG. 7, is shown generally as 1000. In the preferred embodiment, the detection of errors and the one or more header fields are used to determine if the picture header may be corrupted and can be replaced with information from a previous frame. An error in the first slice or GOB may be an indication that the decoder is operating based upon modes that have been activated or deactivated erroneously. The disclosed invention attempts to suspect and correct errors in the header by using this information and the header field values in the current and previous frames. Based upon the header field values it can recover the majority of the picture header from the previous frame, correcting the erroneous header fields.

In H.263, the Group of Block Frame ID (GFID) is one of the header fields used. In other signaling schemes like MPEG-4, the GFID is absent. In this case, another set of criteria is used to confirm or reject a suspected error in the picture header.

In conventional decoding, a slice is received and checked for errors (block 1010). If the block is without error (block 1015), the current header information is left intact (block 1020), the header information is stored (block 1025), and the next slice is checked for error (block 1010). Following an error in the first slice or GOB (block 1015), the decoder searches for the next GOB, slice, or picture start code marker from which to resume decoding (block 1030). In the preferred embodiment, the decoder stores the header field contained within the next slice or GOB header (block 1040) and compares the value of the field to the corresponding header field value from the previous frame (block 1045). If the header field value in the second slice is equal to the majority of the header field values of the slices or GOBs in the previous frame, then this verifies that this header field related picture header information has not changed. In the preferred embodiment, the decoder then copies over the header field related picture header information from the previous frame and uses it as the header information for the current frame (block 1055).

If the header field values of the two frames are not the same, indicating that coding information has changed from the previous frame to the current, then the header information is not replaced. In this case the decoder assumes that the header is not in error but that the slice or GOB data itself is corrupted (block 1050). The pseudo code for the picture header algorithm is given as:

```
if(error_in_first_slice_or_GOB){
    Check header field of next valid slice.
    if(header field of next slice==majority of corresponding
       header field values from previous frame){
        Restore the current frame's picture header using pre-
          vious frames
    }
    else{
        Leave current frame's header intact
    {
{
```

It is recognized that the pseudocode illustrates one particular implementation or embodiment of many for practicing the methodology of this aspect of the present invention. In particular, more than one header field may be used in the comparison without departing from the spirit and scope of the present invention.

This invention allows for a majority of picture data and picture header information to be recovered if the mode information has not changed while still accounting for the fact that the data itself may be in error. Using the disclosed invention, the decoder can operate more efficiently, especially in low bit rate scenarios where the frame rate is normally low and the importance of each frame is greater.

In signaling schemes such as H.263, the GFID header field is present and may be used for detecting changes between the current frame and previous frames. For signaling schemes like MPEG-4, the GFID header field is not present. In these cases, the most important mode, stored in a header field, is the coding type (vop_coding_type) of the frame, which can be "Intra" or "Predictive". To detect an error in the coding type, the suspicion criteria used are listed below:

1. The header field vop_fcode_forward has changed from the previous frame.
2. The header field intra_dc_vlc_threshold has changed from the previous frame.
3. There have been no good MB decoded so far.
4. The number of bits decoded is inconsistent with the expected number of bits based on previous history.

If an error is detected in the first slice and the suspicion criteria, each weighed by a weighting factor, exceed a pre-set threshold, an error in the vop_coding_type is detected and corrective action is taken. In the preferred embodiment, vop_coding_type is changed to "Predictive" if it was decoded as "Intra" and vice versa.

The approaches used for signaling schemes MPEG-4 and H.263 are particular examples of a mechanism for mode change detection. H.263 uses the GFID field for picture header error detection, while MPEG-4 utilizes the parameters stored in the header fields in conjunction with a measure of the bits decoded to make a similar determination. These approaches can be considered specific instances of a change detection mechanism that may be used to determine picture header errors. This mechanism allows recovery from erroneously decoded picture coding types.

Figure 2:
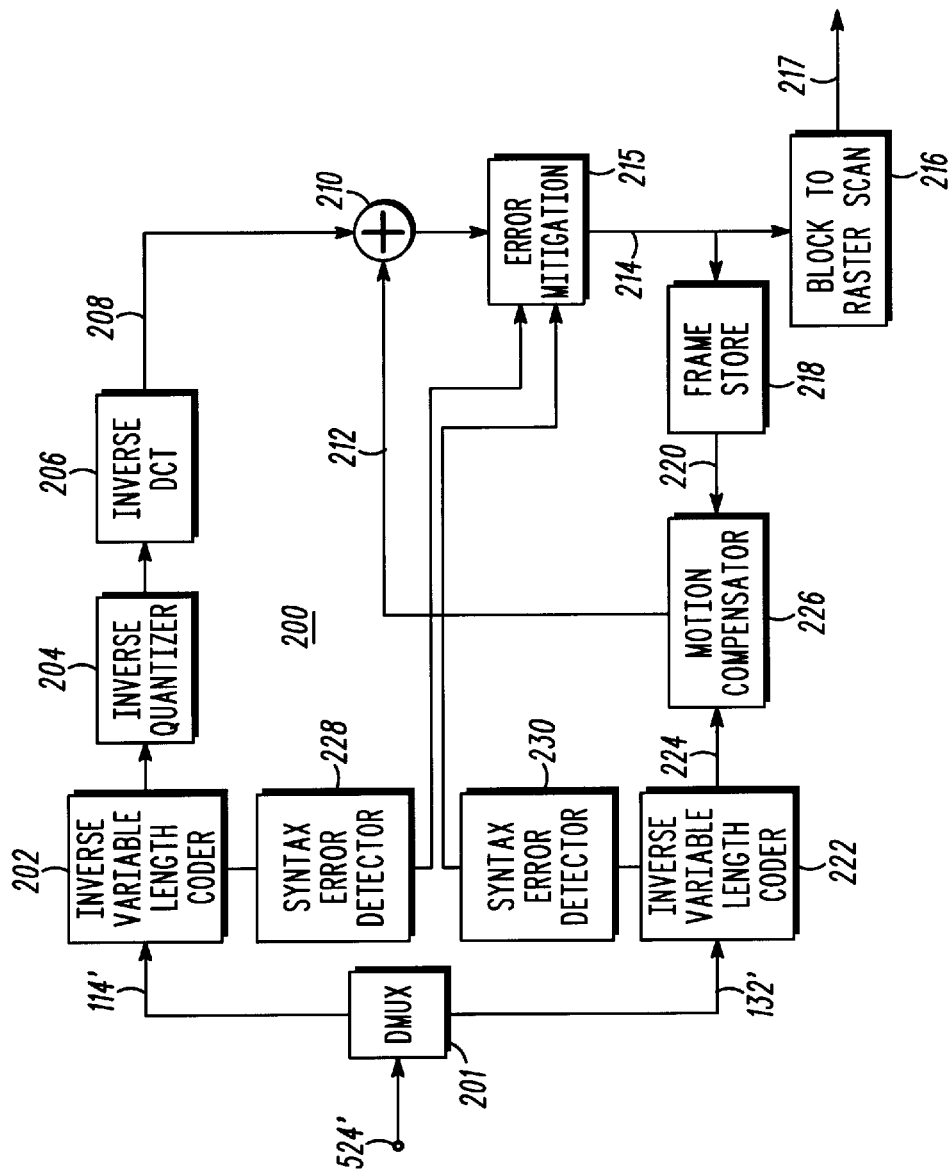
FIG. 2 is a simplified block diagram of an exemplary decoder.
Figure 3:
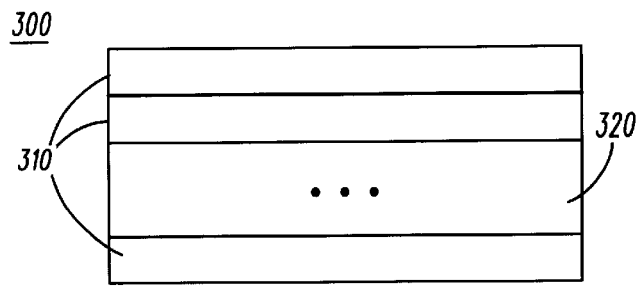
FIG. 3 is a frame structure used in video coding standards.
Figure 4:
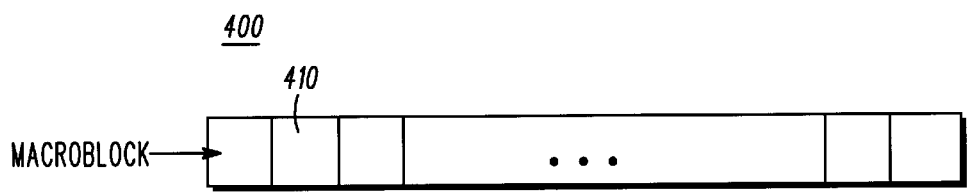
FIG. 4 is a group of block (GOB) or slice structure composed of multiple Macroblocks used in video coding standards.
Figure 5:
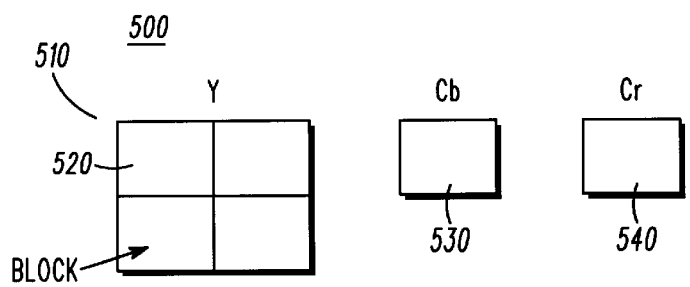
FIG. 5 shows the composition of a macroblock.

The preceding discussion regarding FIGS. 8, 9, and 10 describe the operation of the picture start code algorithm of block 715, the picture header algorithm of block 725, and the timestamp algorithm of block 735. It should be noted that while the block flow diagrams if FIGS. 7, 8, 9 and 10 indicate a software-based solution, the functionality of the picture start code algorithm of block 715, the picture header algorithm of block 725, and the timestamp algorithm of block 735 can also be implemented in hardware, or in embedded software on a hardware based system without departing from the spirit and scope of the present invention. Referring again to FIG. 2, the simplified block diagram of a decoder is shown. The functionality of the picture start code algorithm of block 715, the picture header algorithm of block 725, and the timestamp algorithm of block 735 can be incorporated in the error correction block 215 and the frame store of block 218. This functionality could also be incorporated as a separate block within the decoder of FIG. 2 without departing from the spirit and scope of the present invention. In the preferred embodiment, the error correction block 215 contains an error detection component and an error mitigation component, while block-to-raster scan 217 contains a frame memory component. The error detection component, error mitigation component, and frame memory component are operable to handle the error detection, error mitigation and framing related decisions of the three algorithms. In an alternative embodiment, the error detection component, error mitigation component, and frame memory component may be placed in a block preceding the block 202 inverse variable-length coder. This may be possible since these three algorithms are operable to operate solely upon the overhead information, and the overhead information may be processed separately from the frame data.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for the detection and mitigation of one or more errors occurring within a digital bitstream having a plurality of frame information and a plurality of frame overhead information, comprising:

receiving one or more blocks of frame data, said frame data comprising said frame information and said frame overhead information;

applying one or more frame overhead analysis processes in order to determine whether one or more fields of the frame overhead information is in error;

if the frame overhead analysis algorithm is a timestamp algorithm, further comprising:

reconstructing a current absolute timestamp from one or more relative timestamps contained in the frame overhead information;

determining whether the current absolute timestamp is incorrect by comparing a computed difference to a computed positive threshold value and a computed negative threshold value; and if the current absolute timestamp is incorrect, modifying the current absolute timestamp.

if the frame overhead analysis algorithm is a picture start code algorithm, further comprising:

if one or more addresses corresponding to one or more blocks of frame data subsequent to a first block of frame data is less than an address of the first block of frame data, calculating a number of bits received since the first block of frame data was received;

if the number of bits received is less than or equal to a first computed threshold, indicating that an error occurred in the one or more addresses of the one or more subsequent blocks of data; and If the number of bits received exceeds a second computed threshold, assuming that one or more picture start codes of the one or more subsequent blocks has been incorrectly received.

if the frame overhead analysis algorithm is a picture header algorithm, further comprising:

receiving one or more picture headers containing one or more errant fields; and if one or more errant fields of the one or more errant picture headers are not equivalent to one or more fields of one or more correct picture headers, replacing zero, one or more fields within the one or more picture headers containing one or more errant fields.

2. A method in accordance with claim 1, wherein prior to reconstructing an absolute timestamp, determining if one or more previous timestamp errors have occurred.

3. A method in accordance with claim 1, wherein the computed difference is a difference between the current absolute timestamp and one or more previous absolute timestamps.

4. A method in accordance with claim 1, wherein if the current absolute timestamp is correct, updating a threshold formula operable for computing the positive and negative thresholds.

5. A method in accordance with claim 1, wherein if the one or more fields of the one or more errant picture headers are the same as the one or more fields of the one or more correctly received picture headers, indicating that a one or more blocks of frame data are corrupted.

6. A method in accordance with claim 1, wherein a timestamp field is located within one or more picture headers of said frame overhead information.

7. A method in accordance with claim 1, wherein a picture start code (PSC) is located within one or more picture headers of said frame overhead information.

8. A method in accordance with claim 1, wherein if the received blocks of frame data are without error, storing picture headers corresponding to the received blocks of frame data.

9. A method in accordance with claim 1, further comprising:

detecting changes in the one or more fields of the frame overhead information by comparing the one or more fields to a corresponding one or more fields of a previous frame overhead information; and utllizing past detection history of the correctness of previously received frames in determining the correctness of a current frame.

10. A method in accordance with claim 1, wherein if the one or more fields of the one or more errant picture headers are not the same as the one or more fields of the one or more correct picture headers, replacing header information of the one or more errant picture headers with header information of the one or more correct picture headers.

11. A method in accordance with claim 1, wherein the one or more fields of the one or more correct picture headers comprise a majority of a received picture headers of a previous frame.

12. A method in accordance with claim 1, wherein the first computed threshold is a fixed value.

13. A method in accordance with claim 1, wherein the second computed threshold is a fixed value.

14. A method in accordance with claim 1, wherein the first computed threshold is equal to the second computed threshold.

15. A method in accordance with claim 1, wherein if the number of bits exceeds the second computed threshold, a previous frame header is copied into a header location of the current frame.

16. A method in accordance with claim 1, wherein if the number of bits exceeds the second computed threshold, a previous frame header is copied into a new header location of the current frame and a resulting new frame timestamp is equal to an old frame timestamp plus a correction value.

17. A method in accordance with claim 1, wherein the positive threshold is equal to the negative threshold.

18. A method in accordance with claim 3, wherein the current absolute timestamp is computed independently of the one or more previous absolute timestamps.

19. A method in accordance with claim 3, wherein the current absolute timestamp is wrapped around if the current absolute timestamp is less than one or more of the previous absolute timestamps.

20. A method in accordance with claim 3, wherein the current absolute timestamp is wrapped around if the current absolute timestamp is less than the previous absolute timestamp by at least the value of the negative threshold.

21. A method in accordance with claim 3, wherein computing the difference between the current absolute timestamp and one or more previous absolute timestamps comprises:

determining an algebraic difference between the current absolute timestamp and one or more of the previous absolute timestamps.

22. A method in accordance with claim 1, wherein reconstructing the absolute timestamp information comprises:

determining whether the one or more relative timestamps include fractional seconds of unit time;

determining whether the one or more relative timestamps include a wrap-around at a one second interval.

23. A method in accordance with claim 1, wherein the timestamp error detection and mitigation process further comprises:

computing one or more statistical quantities from each block of frame data of the one or more blocks of frame data.

24. A method in accordance with claim 23, wherein the one or more statistical quantities of a current received frame include a previous frame size of a previous block of frame data and an average frame size of a one or more blocks of frame data.

25. A method in accordance with claim 24, determining the average frame size in accordance with:

$$averageFrameSize=(\eta*averageFrameSize)+(\mu*prevFrameSize)$$

wherein averageFrameSize is initially set to a constant value and $\eta$ and $\mu$ are weighting factors.

26. A method in accordance with claim 1, wherein the second threshold is a weighted average of the number of bits that are expected to have been received by the decoder between a first block and a last block of the subsequent blocks.

27. A method in accordance with claim 1, wherein the second threshold is defined as:

bitThreshold=α*avgBitsPerMBPrevFrame*numMB where avgBitsPerMBPrevFrame represents an average number of bits per block received in one or more previous frames, α is a weighting factor, and numMB is a number of blocks that lie between a first block and a last block of the subsequent blocks.

28. A method in accordance with claim 27, wherein the avgBitsPerMBPrevFrame may be calculated using an average number of bits per block received in the current frame.

29. A method in accordance with claim 3, wherein modifying the current absolute timestamp comprises:
    setting the current absolute timestamp equal to a previous absolute timestamp plus an estimate of the change between the current absolute timestamp and one or more previous absolute timestamps.

30. A method in accordance with claim 29, wherein the estimate of the change between the current absolute timestamp and one or more previous absolute timestamps is equal to the number of previous absolute timestamps in the bitstream.

31. A method in accordance with claim 29, wherein the estimate of the change between the current absolute timestamp and one or more previous absolute timestamps is computed from a history of a number of bits per frame and a history of a number of interframe time intervals.

32. A method in accordance with claim 31, wherein the averageFrameSize is:

averageFrameSize=(η*averageFrameSize)+(μ*prevFrameSize)

and where averageFrameSize has a constant initial value, η and μ are weighting factors.

33. A method in accordance with claim 31, where averagaDeltaTR is:

averageDeltaTR=(η*averageDeltaTR)+(μ*deltaTR)

wherein the averageDeltaTR has a constant initial value, deltaTR is equal to a computed algebraic difference between the current absolute timestamp and one or more previous absolute timestamps and η and μ are weighting factors.

34. A method in accordance with claim 1, wherein the positive threshold is:

positiveThreshold=($C_1$*estimatedDeltaTR)+($C_2$*threshExtension)

wherein estimatedDeltaTR is computed from a history of a number of bits per frame and a history of a number of interframe time intervals
$C_1$ and $C_2$ are weighting factors, and threshExtension is a number of times the timestamp is incorrect.

35. A method in accordance with claim 34, wherein the average frame size is averageFrameSize=(η*averageFrameSize)+(μ*prevFrameSize)

wherein the averageFrameSize is initially set to a constant value and η and μ are weighting factors.

36. A method in accordance with claim 3, where the negative threshold is zero if a previous timestamp of the one or more previous timestamps is correct, and is otherwise:

negativethreshold=($C_3$*estimatedDeltaTR)+($C_4$*threshExtension)

wherein a threshExtension is the number of times the timestamp is incorrect, and
$C_3$ and $C_4$ are weighting factors, and
estimatedDeltaTR is computed from a history of a number of bits per frame and a history of a number of inter-frame time intervals.

37. A method for detection and mitigation of one or more picture header errors occurring within a bitstream including a plurality of frame information and a plurality of corresponding frame overhead information, comprising:
    receiving one or more blocks of frame data;
    identifying one or more errant picture headers of the one or more blocks of frame data;
    receiving one or more subsequent blocks of frame data;
    identifying one or more correct picture headers of the one or more subsequent blocks;
    comparing one or more fields of the one or more errant picture headers with one or more fields of the one or more correct picture headers;
    if the one or more fields of the one or more errant picture headers are not the same as the one or more fields of the one or more correct picture headers, replacing zero, one or more fields within the one or more picture headers errantly received; and
    if the one or more fields of the one or more errant picture headers are the same as the one or more fields of the one or more correct picture headers, assuming one or more blocks of frame data are corrupted.

38. A method in accordance with claim 37, wherein if the received blocks of frame data are without error, the picture headers corresponding to the correctly received headers are stored.

39. A method in accordance with claim 37, further comprising:
    detecting changes in the one or more fields of the frame overhead information by comparing the one or more fields to a corresponding one or more fields of a previous frame overhead information; and
    utlilizing past detection history of the correctness of previously received frames in determining the correctness of the current frame.

40. A method in accordance with claim 37, wherein if the one or more fields of the one or more errant picture headers are not the same as the one or more fields of the one or more correct picture headers, all the header information of the one or more errant picture headers is replaced by the header information of the one or more correct picture headers.

41. A method in accordance with claim 32, wherein the one or more fields of the one or more correct picture headers are the majority of the received picture headers of the previous frame.

42. A method for detection and mitigation of one or more picture start code errors occurring within a bitstream including a plurality of frame information and plurality of corresponding frame overhead information, comprising:
    receiving a first block of frame data;
    receiving one or more subsequent blocks of frame data;
    comparing the address of the first block of frame data to the addresses of the one or more subsequent blocks of frame data;
    if the address of one or more of the one or more subsequent blocks of frame data is less than the address of the first block of frame data, calculate a number of bits received since receiving the first block of frame data;
    if the number of bits received is less than or equal to a first computed threshold, assume an error occurred in one or more addresses of the one or more subsequent blocks of data; and If the number of bits received exceeds a second computed threshold, assume that the picture start code of the one or more subsequent blocks has been incorrectly received.

43. A method in accordance with claim 42, wherein the second computed threshold is a fixed value.

44. A method in accordance with claim 42, wherein the second computed threshold is equal to the first computed threshold.

45. A method in accordance with claim 42, wherein the first computed threshold is a fixed value.

46. A method in accordance with claim 42, wherein if the number of bits exceeds the second computed threshold, a previous frame header is copied into a new header location.

47. A method in accordance with claim 42, wherein if the number of bits exceeds the second computed threshold, a previous frame header is copied into a new header location and a new frame timestamp is equal to the current frame timestamp plus a correction value.

48. A method in accordance with claim 42, wherein the second threshold is a weighted average of the number of bits that are expected to have been received by the decoder between the first block and the last slice of the subsequent blocks.

49. A method in accordance with claim 42, wherein the second threshold is defined as:

$$bitThreshold = \alpha * avgBitsPerMBPrevFrame * numMB$$

where avgBitsPerMBPrevFrame represents an average number of bits per block received in one or more previous frames, $\alpha$ is a weighting factor, and numMB is a number of blocks that lie between a first block and a last block of the subsequent blocks.

50. A method in accordance with claim 49, wherein the avgBitsPerMBPrevFrame may be calculated using an average number of bits per block received in the current frame.

51. A method for detection and mitigation of one or more timestamp errors occurring within a bitstream including a plurality of frame information and plurality of corresponding frame overhead information, comprising:
    receiving one or more blocks of frame data;
    determining if previous timestamp errors have occurred;
    computing a negative threshold and a positive threshold;
    reconstructing the absolute timestamp information;
    computing a change between a current absolute timestamp and one or more previous absolute timestamps;
    determining whether the current absolute timestamp is incorrect by comparing the change to the positive threshold and the negative threshold;
    if the current absolute timestamp is incorrect, modify the current absolute timestamp;
    if the current absolute timestamp is correct, update a threshold formula used in computing the threshold values; and
    compute one or more statistical quantities using information within the current received frame.

52. A method in accordance with claim 51, wherein the positive threshold is equal to the negative threshold.

53. A method in accordance with claim 51, wherein the current absolute timestamp is computed independent of a previous absolute timestamp.

54. A method in accordance with claim 51, wherein the current timestamp is wrapped around if the current timestamp is less than one or more of the previous timestamps.

55. A method in accordance with claim 51, wherein the current timestamp is wrapped around if the current timestamp is less than a previous timestamp by at least the value of the negative threshold.

56. A method in accordance with claim 51, wherein reconstructing the absolute timestamp information comprises:
    determining whether the one or more relative timestamps include fractional seconds of unit time;
    determining whether the one or more relative timestamps include a wrap-around at a one second interval.

57. A method in accordance with claim 51, wherein computing the change between the current absolute timestamp and zero, one or more previous absolute timestamps is achieved by taking an algebraic difference between the current absolute timestamp and a previous timestamp.

58. A method in accordance with claim 51, wherein modifying the current absolute timestamp comprises setting the current absolute timestamp equal to a previous absolute timestamp plus an estimate of the change between the current absolute timestamp and zero, one or more previous absolute timestamps.

59. A method in accordance with claim 58, wherein the estimate of the change between the current absolute timestamp and zero, one or more previous absolute timestamps is equal to a number of previous absolute timestamps.

60. A method in accordance with claim 58, wherein the estimate of the change between the current absolute timestamp and zero, one or more previous absolute timestamps, is computed from a history of a number of bits per frame and a history of a number of inter-frame time intervals.

61. A method in accordance with claim 60, where averageFrameSize is further defined as:

$$averageFrameSize = (\eta * averageFrameSize) + (\mu * prevFrameSize)$$

where averageFrameSize has a constant initial value and $\eta$ and $\mu$ are weighting factors.

62. A method in accordance with claim 60, where averagaDeltaTR is:

$$averageDeltaTR = (\eta * averageDeltaTR) + (\mu * deltaTR)$$

where the averageDeltaTR has a constant initial value, deltaTR is equal to a computed algebraic difference between the current absolute timestamp and a previous absolute timestamp, and $\eta$ and $\mu$ are weighting factors.

63. A method in accordance with claim 51, wherein the positive threshold is:

$$positivethreshold = (C_1 * estimatedDeltaTR) + (C_2 * threshExtension)$$

where estimatedDeltaTR is computed from a history of a number of bits per frame and a history of a number of interframe time intervals,
    $C_1$ and $C_2$ are weighting factors, and where threshExtension is equal to a number of times the timestamp is incorrect.

64. A method in accordance with claim 63, wherein the average frame size is equal to $$averageFrameSize = (\eta * averageFrameSize) + (\mu * prevFrameSize)$$

where the averageFrameSize is initially set to a constant value, and $\eta$ and $\mu$ are weighting factors.

65. A method in accordance with claim 51, where the negative threshold is computed as zero if the previous timestamp is correct, and negative threshold is otherwise:

$$negativeThreshold = (C_3 * estimatedDeltaTR) + (C_4 * threshExtension)$$

where the threshExtension is a number of times the timestamp is incorrect, and $C_3$ and $C_4$ are weighting factors, and estimatedDeltaTR is computed from a history of a number of bits per frame and a history of a number of inter-frame time intervals.

66. A method in accordance with claim 58, wherein the average frame size is equal to $$averageFrameSize=(\eta*averageFrameSize)+(\mu*prevFrameSize)$$

where the averageFrameSize is initially set to a constant value, prevFrameSize is a previous frame size and $\eta$ and $\mu$ are weighting factors.

67. A method in accordance with claim 51, wherein the one or more statistical quantities of the current received frame include a previous frame size and a average frame size.

68. A method in accordance with claim 67, wherein the average frame size is equal to $$averageFrameSize=(\eta*averageFrameSize)+(\mu*prevFrameSize)$$

where the averageFrameSize is initially set to a constant value, prevFrameSize is a previous frame size and $\eta$ and $\mu$ are weighting factors.

69. A device operable for the detection and mitigation of errors occurring within a bitstream of a digital video input, wherein the device comprises:

an error detector element, coupled to the received digital input, operable to utilize information in a received bitstream for determining when one or more errors are present in one or more frame overhead fields of the received bitstream; and an error mitigation element, coupled to the error detector element, operable, in response to the error detector finding the one or more errors in one or more frame overhead fields, operable to replace corrupted information in the received bitstream with improved information in accordance with one or more formulae.

70. A device in accordance with claim 69, further comprises:

an output frame processor, operable to be coupled to the error mitigation element, for updating an output buffer of the device in accordance with the one or more formulae used by the error mitigation element.

71. A device in accordance with claim 69, wherein the device is a codec.

72. A device in accordance with claim 69, wherein the timestamp field is located within one or more fields of the one or more frame overhead fields of the received bitstream.

73. A device in accordance with claim 69, wherein the error detection element and the error mitigation element are the same element.

74. A device in accordance with claim 69, wherein one or more of the error detection element and the error mitigation element comprise a computer readable medium containing instructions which, when executed on a computer, carry out a formula of the one or more formulae.

75. A device in accordance with claim 69, wherein a picture start code is located within the one or more frame overhead fields of the received bitstream.

76. A device in accordance with claim 71, wherein the error detection element and error mitigation element are coupled to an error correction element of the codec.

77. A device in accordance with claim 70, wherein the output frame processor is coupled to a raster scan element of a codec.

78. A device in accordance with claim 69, wherein a formula of the one or more formulae, further comprises:

the error detection element determining if one or more previous timestamp errors have occurred;

the error detection element reconstructing a current absolute timestamp from one or more relative timestamps contained in the frame overhead information;

the error detection element computing a difference between the current absolute timestamp and zero, one or more previous absolute timestamps;

the error detection element determining whether the current absolute timestamp is incorrect by comparing the difference to a computed positive threshold and a computed negative threshold;

if the current absolute timestamp is incorrect, the error mitigation element modifying the current absolute timestamp; and if the current absolute timestamp is correct, the error mitigation element updating a threshold formula used in computing the computed positive threshold and the computed negative threshold.

79. A device in accordance with claim 78, wherein the error detection element sets the positive threshold equal to the negative threshold.

80. A device in accordance with claim 78, wherein the error detection element computes the current absolute timestamp independent of a previous absolute timestamp.

81. A device in accordance with claim 78, wherein the error detection element wraps around the current timestamp if the current timestamp is less than one or more of the previous timestamps.

82. A device in accordance with claim 78, wherein the error detection element wraps around the current timestamp if the current timestamp is less than a previous timestamp by at least a value of the negative threshold.

83. A device in accordance with claim 78, wherein the error detection element reconstructs the absolute timestamp information by:

determining whether the one or more relative timestamps include fractional seconds of unit time;

determining whether the one or more relative timestamps include a wrap-around at a one second interval.

84. A device in accordance with claim 78, wherein the error detection element computes a change between the current absolute timestamp and zero, one or more previous absolute timestamps by taking an algebraic difference between the current absolute timestamp and a previous timestamp.

85. A device in accordance with claim 78, wherein the error mitigation element modifies the current absolute timestamp by setting the current absolute timestamp equal to a previous absolute timestamp plus an estimate of the change between the current absolute timestamp and zero, one or more previous absolute timestamps.

86. A device in accordance with claim 85, wherein the error mitigation element sets the estimate of the change between the current absolute timestamp and zero, one or more previous absolute timestamps equal to a number of previous absolute timestamps.

87. A device in accordance with claim 85, wherein the error mitigation element computes the estimate of the change between the current absolute timestamp and zero, one or more previous absolute timestamps from a history of a number of bits per frame and a history of a number of inter-frame time intervals.

88. A device in accordance with claim 85, where averageFrameSize is:

$$averageFrameSize=(\eta*averageFrameSize)+(\mu*prevFrameSize)$$

where averageFrameSize has a constant initial value and $\eta$ and $\mu$ are weighting factors.

89. A device in accordance with claim 87, where averaDeltaTR is:

$$averageDeltaTR=(\eta*averageDeltaTR)+(\mu*deltaTR)$$

where the averageDeltaTR has a constant initial value, deltaTR is a computed algebraic difference between the current absolute timestamp and a previous absolute timestamp, and $\eta$ and $\mu$ are weighting factors.

90. A device in accordance with claim 78, wherein the error detection element computes the positive threshold as:

$$positive threshold=(C_1*estimatedDeltaTR)+(C_2*threshExtension)$$

where estimatedDeltaTR is computed from a history of a number of bits per frame and a history of a number of interframe time intervals $C_1$ and $C_2$ are weighting factors, and where threshExtension is equal to a number of times the timestamp is incorrect.

91. A device in accordance with claim 90, wherein the average frame size is equal to $$averageFrameSize=(\eta*averageFrameSize)+(\mu*prevFrameSize)$$

where the averageFrameSize is initially set to a constant value and $\eta$ and $\mu$ are weighting factors.

92. A device in accordance with claim 78, where the error detection element computes the negative threshold as zero if a previous timestamp is correct, and negative threshold is otherwise equal to:

$$negativeThreshold=(C_3*estimatedDeltaTR)+(C_4*threshExtension)$$

where the threshExtension is equal to a number of times the timestamp is incorrect, and $C_3$ and $C_4$ are weighting factors, and estimatedDeltaTR is computed from a history of a number of bits per frame and a history of a number of interframe time intervals.

93. A device in accordance with claim 92, wherein the average frame size is:

$$averageFrameSize=(\eta*averageFrameSize)+(\mu*prevFrameSize)$$

where the averageFrameSize is initially set to a constant value, and $\eta$ and $\mu$ are weighting factors.

94. A device in accordance with claim 70, wherein the error mitigation element computes one or more statistical quantities of the current received frame, including a previous frame size and an average frame size.

95. A device in accordance with claim 94, wherein the average frame size is:

$$averageFrameSize=(\eta*averageFrameSize)+(\mu*prevFrameSize)$$

where the averageFrameSize is initially set to a constant value, and $\eta$ and $\mu$ are weighting factors.

96. A device in accordance with claim 79, wherein a formula of the one or more formulae further comprises:

the error detection element comparing an address of a first block of frame data to one or more addresses of one or more subsequent blocks of frame data;

if one or more addresses of the one or more subsequent blocks of frame data is less than an address of the first block of frame data, the error detection element calculating a number of bits received since receiving the first block of frame data;

if the number of bits received is less than or equal to a first computed threshold, the error detection element assuming an error occurred in one or more addresses of the one or more subsequent blocks of data; and if the number of bits received exceeds a second computed threshold, the error mitigation element assuming that a picture start code of the one or more subsequent blocks has been incorrectly received.

97. A device in accordance with claim 96, wherein the bit threshold computed by the error detection element is a fixed value.

98. A device in accordance with claim 96, wherein if the number of bits exceeds a computed threshold, the frame processing element copies a previous frame header into a new header location.

99. A device in accordance with claim 96, wherein if the number of bits exceeds the second computed threshold, the frame processing element copies a previous frame header into a new header location and a new frame timestamp is equal to an old frame timestamp plus 1.

100. A device in accordance with claim 96, wherein the error detection element computes the second threshold to be a weighted average of the number of bits that are expected to have been received by the error detection element between a first block and a last block of the subsequent blocks.

101. A device in accordance with claim 100, wherein the second threshold is:

$$bitThreshold=\alpha*avgBitsPerMBPrevFrame*numMB$$

where avgBitsPerMBPrevFrame represents an average number of bits per block received in one or more previous frames, $\alpha$ is a weighting factor, and numMB is a number of blocks that lie between a first block and a last block of the subsequent blocks.

102. A device in accordance with claim 101, wherein the avgBitsPerMBPrevFrame may be calculated by the error detection unit using an average number of bits per block received in the current frame.

103. A device in accordance with claim 78, wherein a formula of the one or more formulae, further comprises:

the error detection element detecting that one or more picture headers contain one or more errant fields;

the error mitigation element comparing one or more fields of one or more errant picture headers with one or more fields of one or more correct picture headers;

if the one or more fields of the one or more errant picture headers are not the same as the one or more fields of the one or more correct picture headers, the error mitigation element replacing zero, one or more fields within the one or more picture headers errantly received; and if the one or more fields of the one or more errant picture headers are the same as the one or more fields of the one or more correct picture headers, the error mitigation element indicating one or more frames of picture information are corrupted.

104. A device in accordance with claim 103, wherein if the received blocks of frame data do not contain one or more errors, the error mitigation element stores one or more picture headers corresponding to one or more correctly received headers.

105. A device in accordance with claim 103, wherein the error detection element detects changes in the one or more fields of the frame overhead information by comparing the one or more fields to a corresponding one or more fields of a previous frame overhead information; and wherein the error mitigation element indicates the correctness of a current received frame upon analyzing one or more previously received frames.

106. A device in accordance with claim 103, wherein if the one or more fields of the one or more errant picture headers are not the same as the one or more fields of the one or more correct picture headers, the error mitigation element replacing all header information of the one or more errant picture headers by header information of the one or more correct picture headers.

107. A device in accordance with claim 103, wherein the error detection unit replacing zero, one or more fields within the one or more picture headers errantly received if one or more fields of the one or more correct picture headers are a minority of one or more received picture headers of the previous frame.

* * * * *